Patented Dec. 1, 1953

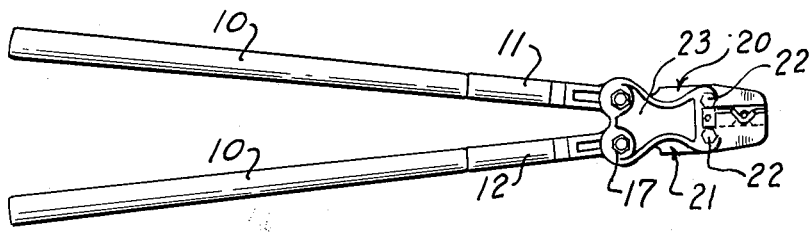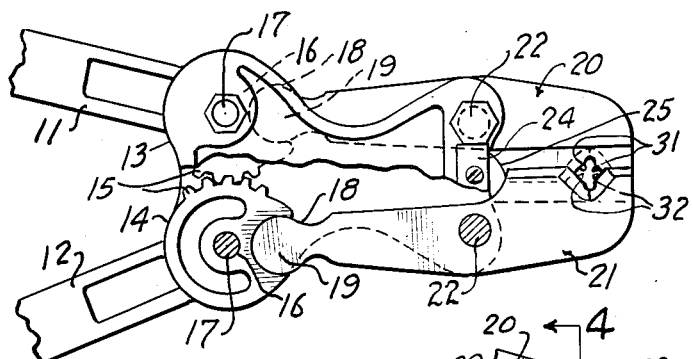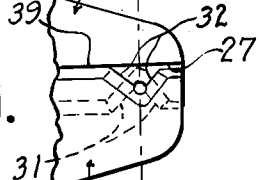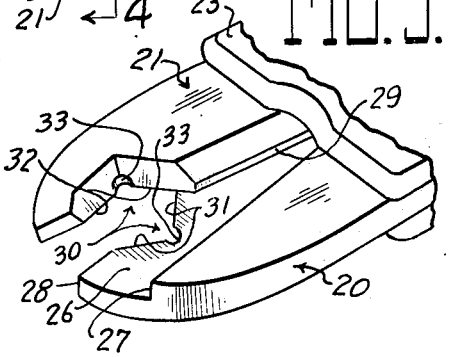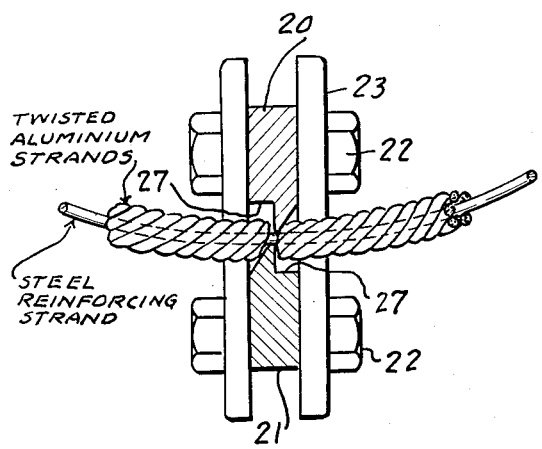

2,660,783

UNITED STATES PATENT OFFICE 2,660,783

PERIPHERAL CUTTER FOR MULTILAYER CABLES

Donald K. Davis, Winona, Minn., and Rudolph K. Rauh, Milwaukee, Wis., assignors to Interstate Drop Forge Company, Milwaukee, Wis., a corporation of Wisconsin Application April 22, 1953, Serial No. 350,394

4 Claims. (Cl. 30—91)

This invention relates to a device for cutting a peripherally extending exterior layer of a multilayer metal cable by cleanly shearing the exterior layers or strands without damaging the inner layers or strands.

Heavy electrical cables are sometimes made in multiple layers, each layer being designed to contribute a particular quality to the finished cable. For example, a cable may have a central layer comprising a strand, plain or twisted, made from a material having a high tensile strength in order to support more than its own weight and one or more exterior layers made from material having high electrical conductivity but less tensile strength. Thus the desirable qualities of the two materials complement each other and the undesirable qualities are offset.

An example of such a cable that has come into widespread use consists in a plurality of twisted aluminum strands to serve as the electrical conductor, aluminum being chosen because of its high conductivity and low weight, which are twisted around a central reinforcing core, usually a steel wire. Transmission cables of this type are used in cross country power transmission where heavy loads must be carried and where long spans of cable are stretched between towers or posts.

When cables of this type are to be spliced or connected to each other it is important not to cut the center reinforcing strand because that strand alone supports the length of cable stretching between the two towers or posts which is to be spliced to another cable. If the center strand is cut during the splicing operation, the entire weight of the long length of cable must be supported in some other way while the exterior conductors are being connected in the splice. If the central weight bearing strand is even nicked or notched during the cutting operation its tensile strength is reduced disproportionately to the reduction in area at the point of damage. Therefore, if the central strand is even slightly damaged during the splicing or other operation, the strength of the cable may be reduced so low as to cause a totally unexpected failure under adverse conditions of wind or ice.

In order to make splices and other changes in cables of this type electricians have in the past cut the exterior twisted aluminum strands, for example, with a hacksaw, and have had to use great care in order to cut these strands without cutting, notching or nicking, and thus weakening, the center supporting strand.

Cutting away the exterior strands with a hacksaw is not satisfactory because as each individual strand in the twisted aluminum cable is cut it has a tendency to unravel. This is particularly true where a second cut is being made only some inches removed from the first cut so that each short piece of cable strand is free to move as its second end is cut.

Furthermore, when working with a hacksaw, it is difficult to cut completely through an exterior layer without coming into contact with the closely adjacent surface of the inner core.

It is an object of this invention to provide a peripheral cutter for a cable which will cut through the exterior strands in one precise shearing action without risk of damaging the center strand.

It is a further object of this invention to provide a peripheral cutter to be used in preparing ACSR (aluminum cable steel reinforced) cable for splicing, by cutting the surrounding aluminum strand without cutting, nicking, notching or otherwise damaging the supporting center steel core.

These objects and the mode of their attainment will be better understood by reference to the specification which follows and to the drawings in which:

Fig. 1 is a plan view of a heavy duty peripheral cutter for cables, including a jaw mechanism embodying the instant invention.

Fig. 2 is a fragmentary greatly enlarged view in elevation of a jaw mechanism embodying the invention as it is constructed in a heavy duty cutter such as that shown in Fig. 1.

Fig. 3 is a fragmentary view in elevation of the actual peripheral cutting portions of the jaws and showing the jaws in their closed position.

Fig. 4 is a fragmentary vertical sectional view on an enlarged scale taken on the line 4—4 of Fig. 3 and also showing the jaws in closed position illustrating how the exterior layer of a cable is severed without damaging the center reinforcing strand.

Fig. 5 is a fragmentary view in perspective showing the precise construction of the jaws of the cutter means constituting the invention.

While a particular type of operating mechanism, i. e., handles, levers and gears, is shown in the drawings as illustrative of the mechanism by which a peripheral cutter embodying the invention is operated, it is to be understood that the precise form of mechanism does not constitute the invention and peripheral cutters for cables according to the invention may be fabricated in different sizes and operated by different mechanisms.

In the heavy duty type of peripheral cutter embodying the invention as illustrated in Fig. 1, the device comprises a pair of elongated heavy duty handles 10 which are fitted into metal arms 11 and 12. The arms 11 and 12 preferably are fabricated as by forging or similar means, to provide great strength in the structure and have circular ends 13 and 14, respectively, the two ends 13 and 14 being "left" and "right" end members. Each of the ends 13 and 14 has a group of segmentally extending teeth 15 cut in its inner periphery. The two circular ends 13 and 14 have axial holes 16 through which bolts 17 are extended to form their turning centers.

At the side of the ends 13 and 14 generally opposite end arms 11 and 12, each of the ends 13 and 14 is provided with a cylindrical socket 18 that is cut into the metal forming the end 13 or 14 so that its center lies inside the perimeter of the end 13 or 14 and thus its walls extend through more than 180°. Each of these sockets 18 is located at a point angularly outside the diameter of its respective end piece 13 or 14 which is an extension of the center line of the arm 11 or 12.

Each of the sockets 18 receives a ball end 19 on one of a pair of jaw levers 20 and 21. The ball ends 19 are cylindrically shaped and are inserted into the sockets 18 by axial movement. The two jaw levers 20 and 21, as is the case with the end pieces 13 and 14, are similar, but reversed, forming "left" and "right" jaw levers respectively.

The jaw levers 20 and 21 are pivotally mounted by bolts 22 in a pair of pivot plates 23 through which the bolts 22 extend and through which the bolts 17 forming the turning centers for the arms 11 and 12 also extend. When the arms 11 and 12 and the jaw levers 20 and 21 are assembled in the pivot plates 23, the segmental gear teeth 15 of the two arms are meshed.

After assembly of the mechanism so far described, the bolts 22 may be locked against rotation by a small plate 24 held in place between the two bolts 22 by a machine screw 25 and in contact with the heads of the bolts 22.

Near its forward end each of the jaw levers 20 and 21 is provided with a shearing cutter constructed according to the invention. Inasmuch as the two jaw levers 20 and 21 and their respective cutters are similar and merely reversed one with respect to the other, a description of one describes both.

As can best be seen by reference to Figs. 2–5, each of the levers 20 and 21 is generally in the form of a flat plate having a milled face 26 which overlaps a similar milled face on the other one of the levers 20 or 21. The inner edges of shoulders 27 formed by milling away the faces 26 are so spaced with respect to each other that inwardly turned edges 28 of the jaw 20 and 29 of the jaw 21 strike against the shoulders 27 when the jaws are closed (see Fig. 3).

Near the end of each of the levers 20 and 21 a generally right angle notch 30 is cut away. The edges of the notches 30 lying in the planes of the faces 26 are sharpened to form two sets of cutting edges 31 on the lever 20 and 32 on the lever 21. As can best be seen by reference to Figs. 2 and 3 the cutting edges 31 and 32 form a generally square opening and the opposed ones of the sets of edges 31 and 32 slide along each other as the jaws are closed, in a shearing action. Reference to Fig. 5 reveals that when the two jaw levers 20 and 21 are opened to their widest extent, i. e., by swinging the handles 10 away from each other, rotating the two circular ends 13 and 14 inwardly toward each other, swinging the ball ends 19 of the levers 20 and 21 inwardly and thus the ends of the levers 20 and 21 away from each other, an opening between the ends of the levers 20 and 21 is provided through which the cable to be cut can be inserted between the sets of cutting edges 31 and 32.

As the handles 10 are moved together the levers 20 and 21 are pivoted on their bolts 22 and the two sets of cutting edges 31 and 32 moved inwardly. The shearing contact between these edges (see Fig. 2) is established before the edges 31 or 32 tighten around the exterior of the twisted aluminum strands as shown, for example, in Fig. 4 and the closing action of the edges 31—32 toward each other, centers the aluminum cable in the square formed by the pairs of edges 31 and 32. As the levers 20 and 21 approach each other the size of the open square between the edges 31 and 32 in which the generally cylindrically cable is located, decreases. The opposed edges 31—32 start to shear the exterior twisted aluminum strands, cleanly cutting through the strands.

At the apexes of the two angles formed by the pairs of edges 31 and 32, semi-cylindrical slots 33 are cut away. The surfaces of these slots 33 are not sharp, but are flattened to provide center strand contacting surfaces that cannot nick, notch or cut into the central strand. When the levers 20 and 21 are completely closed (see Fig. 3) and the cutting edges 31 and 32 acting together have first centered the cable to be peripherally cut and then sheared away the exterior layers of twisted aluminum strands, the two slots 33 form a cylindrical opening in which the center steel reinforcing strand of the cable is centered and located (see also Fig. 4).

Thus a peripheral cutter constructed according to the invention, and as set forth in the subjoined claims, automatically centers itself upon the cable to be cut, cleanly shears the exterior twisted aluminum strands by the opposed section of the shearing edges 31 and 32, maintains the cable in centered position in the opening formed by these opposed sets of shearing edges and cleanly cuts through these aluminum strands, closing around but not damaging the center reinforcing strand.

After an accurate, clean, single action cut has thus been made, the lineman or electrician may either untwist portions of the exterior twisted aluminum strands to enable his splice to be made or, if splices are to be made at spaced distances along the cable, he may make a second cut longitudinally removed a proper distance from the first cut in the same quick, clean and efficient manner. Because the cable is exteriorly grasped by the opposed angularly disposed cutting edges 31 and 32, it is held in its generally cylindrical form during the cutting action and no likelihood of frayed or unraveled ends occurs.

Having described the invention, we claim:

1. A peripheral cutter for a cable having a central bore of one metal and an exterior layer composed of strands of a different metal, said cutter having two opposed pairs of oppositely and angularly directed shearing edges, said edges when open defining a generally rectilinear opening having an open corner through which a cable to be peripherally cut can be inserted, each pair of said edges being arranged to define a V-notch, the apexes of said notches being cut away and forming recesses, said recesses being co-incidental when said pairs of edges are closed together.

2. A peripheral cutter for cutting an exterior layer of a multiple layer metal cable, said cutter comprising a pair of opposed sets of shearing edges, each set of edges being arranged to form a V-notch and said sets of edges being oppositely directed to define a generally rectilinear opening therebetween when open, each of said shearing edges in one set being in sliding contact with the opposed one of the shearing edges in the other set and a semicircular recess at the apex of each of said sets of shearing edges, said recess having a diameter substantially equal to that of the portion of the cable interior of said exterior layer.

3. A peripheral cutter for cutting an exterior layer of a multiple layer cable, said cutter comprising a pair of opposed sets of shearing edges, each set of edges being arranged to form a V-notch and said sets of edges being oppositely directed to define a generally rectilinear opening therebetween when open, each of said shearing edges in one set being in sliding contact with the opposed one of the shearing edges in the other set and a semicircular recess at the apex of each of said sets of shearing edges, said recess having a diameter substantially equal to that of the portion of the cable interior of said exterior layer, and having walls extending axially of the cable a distance sufficient that the surface formed thereby is not sharp enough to penetrate the surface of or deform the material in said cable interior.

4. In a peripheral cutter for a multiple layer metal cable said cutter having opposed jaws and means for moving said jaws toward and away from each other, the improvement comprising overlapping engaging faces on said jaws, said faces being generally planar and slidingly movable relative to each other, opposed V-notches cut in the overlapping faces of said jaws, the edges of said notches being sharpened to form shearing cutters, said notches defining a generally rectilinear opening transversely through said jaws when open and having their apexes generally in line when said jaws are closed, and recesses at the apexes of the notches formed by said sharpened edges, said recesses being co-incidental when said jaws are closed and not being sharpened.

DONALD K. DAVIS.
RUDOLPH K. RAUH.

References Cited in the file of this patent

UNITED STATES PATENTS

| Number | Name | Date |
| --- | --- | --- |
| 717,800 | Bell | Apr. 10, 1902 |
| 1,836,967 | Helwig | Dec. 15, 1931 |
| 2,260,884 | Clinton | Oct. 28, 1941 |
| 2,306,403 | Mortensen | Dec. 29, 1942 |

FOREIGN PATENTS

| Number | Country | Date |
| --- | --- | --- |
| 588,519 | France | Feb. 2, 1925 |